United States Patent
Zmudzinski et al.

(10) Patent No.: US 7,428,609 B2
(45) Date of Patent: Sep. 23, 2008

(54) METHOD AND SYSTEM TO PARTITION HARDWARE RESOURCES BETWEEN OPERATING SYSTEMS

(75) Inventors: Krystof C. Zmudzinski, Forest Grove, OR (US); Saul Lewites, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 11/321,330

(22) Filed: Dec. 29, 2005

(65) Prior Publication Data

US 2007/0156940 A1 Jul. 5, 2007

(51) Int. Cl.
*G06F 12/00* (2006.01)
(52) U.S. Cl. .................. 710/240; 710/260; 711/1
(58) Field of Classification Search ......... 710/240–244, 710/260–269; 711/1
See application file for complete search history.

(56) References Cited

U.S. PATENT DOCUMENTS

| 7,302,512 B1 * | 11/2007 | Currid et al. ........... 710/268 |
| 2003/0005207 A1 * | 1/2003 | Langendorf et al. ...... 710/306 |
| 2003/0097503 A1 * | 5/2003 | Huckins ............... 710/104 |
| 2004/0205258 A1 * | 10/2004 | Wilson et al. ............ 710/1 |
| 2005/0289283 A1 * | 12/2005 | Warrier et al. ............ 711/1 |
| 2006/0168381 A1 * | 7/2006 | Armstrong et al. ....... 710/200 |

OTHER PUBLICATIONS

U.S. Appl. No. 11/241,247; Title: Exposed Sequestered Partition Apparatus, System, and Methods; Filing Date: Sep. 30, 2005; Inventor: Thomas Schultz.
U.S. Appl. No. 11/027,253; Title: System and Method for Implementing Network Security Using A Sequestered Partition; Filing Date: Dec. 30, 2004; Inventor: Pankaj N. Parmar.

* cited by examiner

*Primary Examiner*—Mark Rinehart
*Assistant Examiner*—Kim T Huynh
(74) *Attorney, Agent, or Firm*—Blakely, Sokoloff, Taylor & Zafman LLP

(57) ABSTRACT

Disclosed is a method and system to partition hardware resources between operating systems. A determination is made whether a first PCI resource attached to a line of a bus is to be sequestered to a service operating system (OS). If so, the first PCI resource is sequestered to the service OS. It is next determined whether at least one other PCI resource shares the same line of the bus as the sequestered first PCI resource. If so, the at least one other PCI resource is selected and sequestered to the service OS. The first PCI resource and the other sequestered PCI resource are then hidden from a subsequently loaded host OS.

13 Claims, 8 Drawing Sheets

400

HIDE PCI RESOURCES

| DEVICE (402) | HIDE (404) | DISABLE REGISTER ICH (406) |
|---|---|---|
| DEVICE 1 | YES/NO | ICH VALUE |
| DEVICE 2 | YES/NO | ICH VALUE |
| DEVICE 3 | YES/NO | ICH VALUE |
| ⋮ | YES/NO | ICH VALUE |
| DEVICE N | YES/NO | ICH VALUE |

*FIG. 4*

METHOD AND SYSTEM TO PARTITION HARDWARE RESOURCES BETWEEN OPERATING SYSTEMS

FIELD OF THE INVENTION

Embodiments of the invention relate generally to the field of computing systems, and more particularly, to a method and system to partition hardware resources between operating systems without employing virtualization.

DESCRIPTION OF RELATED ART

Modern computing systems may utilize multiple sets of processing resources, including processing cores, hyper-threads, input/output (I/O) devices, and memory. In fact, modern computing systems are now capable of utilizing multiple different types of operating systems (OSs) as well as increasingly more technologically advanced I/O devices, and a greater number of I/O devices.

A set of processing resources in a computing system may be referred to herein as a "partition". An operating system (OS) may derive partition information from a basic input/output system (BIOS) in the form of device configuration tables. One such table may be structured as a set of advanced configuration and power interface (ACPI) tables. The BIOS may populate the ACPI table(s) with partition information, including resources discovered at system initialization.

It is possible to hide one or more partitions from an OS. For example, random access memory (RAM) may be hidden from an OS by reporting to the OS a subset of discovered resources excluding the RAM. Other devices may also be hidden from an OS by various means. Thus, a resulting execution environment may be created that includes a partition invisible to the OS, referred to herein as a "sequestered partition."

In the context of a computing system utilizing multiple OSs, conflicts may occur between the multiple OSs due to the fact that various peripheral component interface (PCI) resources may share the same interrupt request (IRQ) lines.

BRIEF DESCRIPTION OF THE DRAWINGS

FIG. 4 is a block diagram illustrating a hide PCI resource data structure that may be utilized to collect information about which PCI resources should belong to the service OS and hidden from the host OS, according one embodiment of the present invention.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Furthermore, embodiments of the invention will be described in particular embodiments but may be implemented in hardware, software, firmware, middleware, or a combination thereof.

Figure 1:
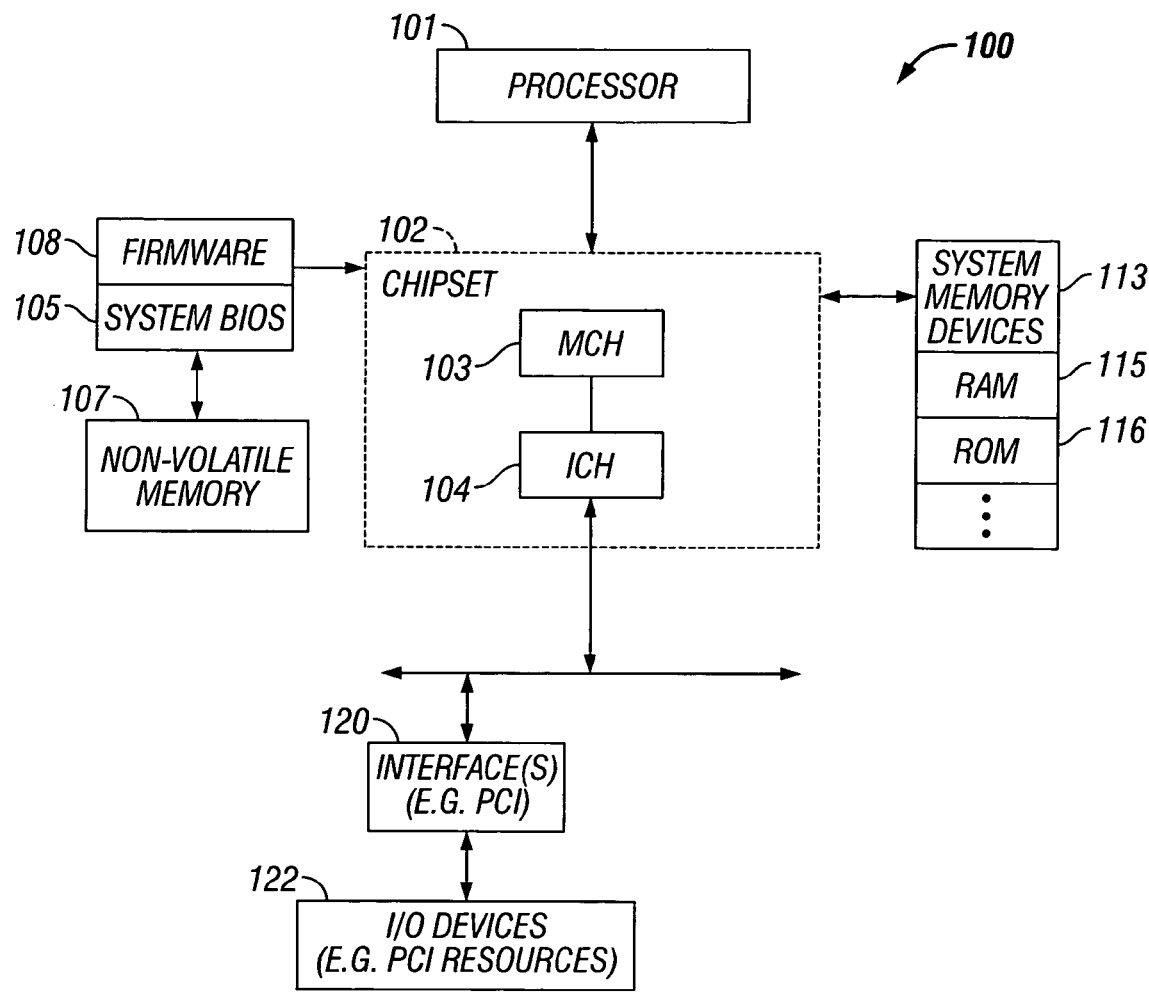
FIG. 1 shows a block diagram of an illustrative embodiment of an exemplary computer system configuration in which embodiments of the invention can be practiced.

With reference to FIG. 1, FIG. 1 shows a block diagram of an illustrative embodiment of an exemplary computer system configuration 100 in which embodiments of the invention can be practiced. The system configuration 100 (often referred to herein as "platform hardware") includes at least one processor 101 such as a central processing unit (CPU) (however, it should be appreciated that multiple processors may be utilized), a chipset 102 which may include a memory controller hub (MCH) 103 and an Input/Output (I/O) controller hub (ICH) 104, firmware 108 including a basic input/output system (BIOS) 105 that may be coupled to chipset 102, system memory devices 113, and one or more interfaces 120 and I/O devices 122. Non-volatile memory 107 may also be coupled to firmware 108 including BIOS 105.

Also, in one embodiment, firmware 108 (e.g. stored in non-volatile memory) may be present that includes instructions to aid in the partitioning of PCI resources between OSs, as will be described.

It should be appreciated that system 100 may be any type of computing system. For example, system 100 may be a server computer, personal computer, network computer, mainframe, hand-held device, etc.

For the purposes of the present specification, the term "processor" refers to any machine that is capable of executing a sequence of instructions and shall be taken to include, but not be limited to, general purpose microprocessors, special purpose microprocessors, application specific integrated circuits (ASIC), multi-media controllers, signal processors and microcontrollers, etc. In one embodiment, the CPU 101 is a general-purpose microprocessor that is capable of executing an Intel® Architecture instruction set. For example, the CPU 101 can be one of the PENTIUM classes of processors, one of the CELERON classes of processors, or one of the ITANIUM classes of processors.

The CPU 101 may be coupled to the chipset 102 by a front-side bus (FSB). As previously discussed, in one example, the chipset 102 may include an MCH 103 and an ICH 104, which are coupled to one another. The MCH may be responsible for servicing memory transactions that target the system memory devices 113. The MCH can be a stand-alone unit, an integrated part of a chipset, or a part of some larger unit that controls the interfaces between various system components and the system memory devices 113.

The system memory devices 113 can include any memory device adapted to store digital information, such as random access memory (RAM) 115 and read-only memory (ROM) 116. Examples of RAM include static random access memory (SRAM), dynamic random access memory (DRAM), synchronous dynamic random access memory (SDRAM), and double data rate (DDR) SDRAM or DRAM, etc. System memory devices 113 can also include non-volatile memory such as read-only memory (ROM) 116.

In one example, the ICH 104 of the chipset 102 may provide interface control between the MCH and various interfaces 120 and I/O devices 122 such as through peripheral component interconnect (PCI) interface 120 including devices, buses, ports, slots, etc. For example, I/O devices may include a monitor, a keypad, a modem, a printer, storage devices (e.g. Compact Disk ROM (CD ROM), Digital Video Disk (DVD), hard drive, floppy drive, etc.) or any other types of I/O devices, e.g., input devices (mouse, trackball, pointing device), media cards (e.g. audio, video, graphics), network interfaces, USB devices, etc. These types of I/O devices utilized in conjunction with a PCI interface may be referred to herein as "PCI resources".

It should be appreciated that computer system or platform 100 may include a wide variety of different interfaces and I/O devices as well.

Figure 2:
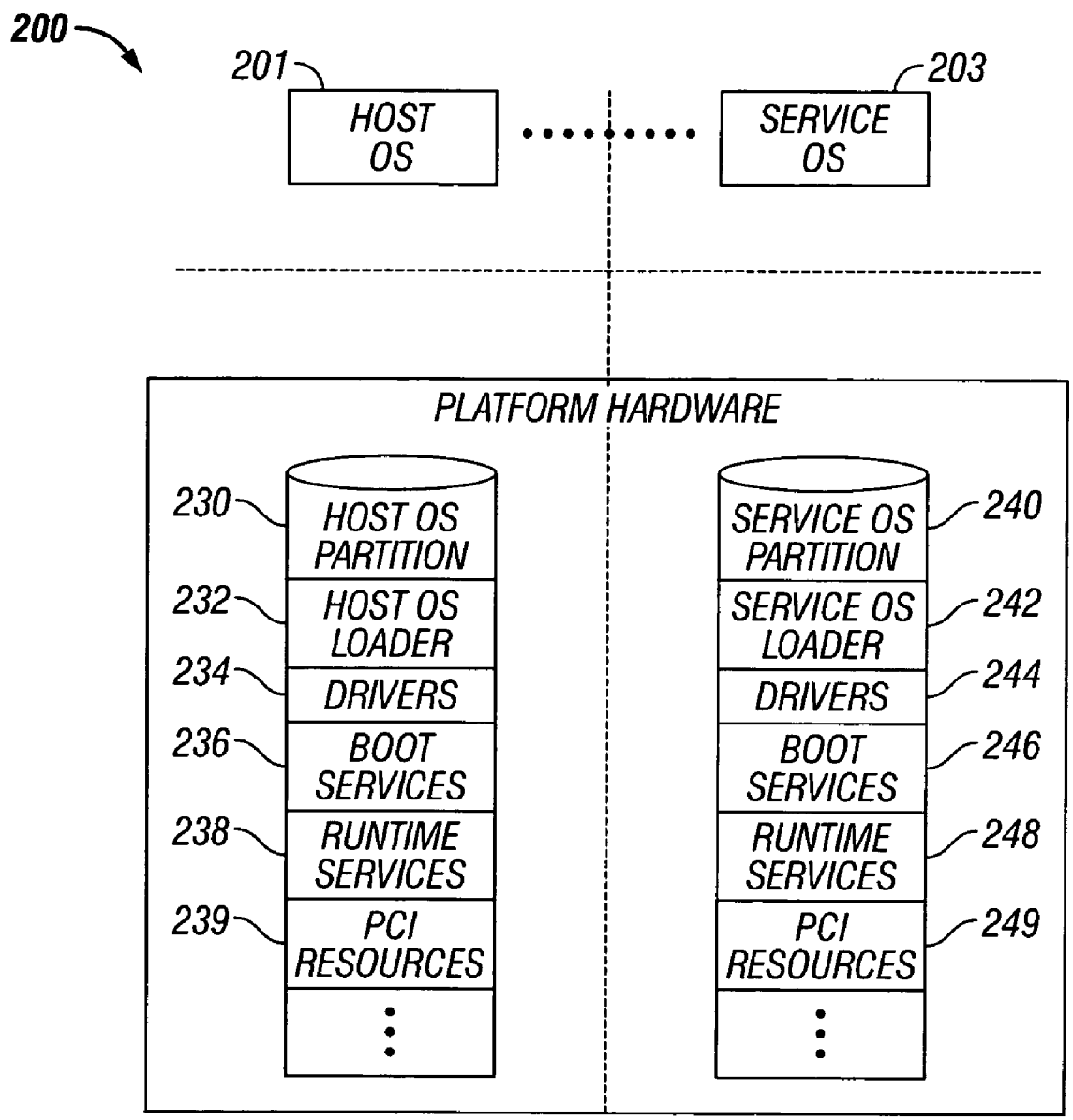
FIG. 2 is a block diagram illustrating components of a system that may implement a host OS partition and a service OS partition operable in the computer system, in which embodiments of the invention may be practiced.

With reference to FIG. 2, FIG. 2 is a block diagram illustrating components of a system 200 that may implement a host OS 201 and a service OS 203 operable in the previously-described platform hardware or computer system 100, in which embodiments of the invention may be practiced.

As can be seen in FIG. 2, a host OS partition 230 for a host operating system 201 is shown. The host OS partition 230 includes a host OS loader 232, drivers 234, boot services 236, run time services 238, a set of PCI resources 239, etc. Similarly, a service OS partition 240 for a service OS 203 is shown. The service OS partition 240 similarly includes a service OS loader 242, drivers 244, boot services 246, and run time services 248, and a set of PCI resources 249.

It should be appreciated that host OS loader 232 and boot services 236 may be used in loading host OS 201. Runtime services 238 may provide runtime services to host OS 201. Similarly service OS loader 242 and boot services 246 may be used in loading service OS 203. Runtime services 248 may provide runtime services to service OS 203. Also, it should be appreciated that there may be multiple service OSs. It should be appreciated that runtime services and boot services may be provided by firmware 108.

In one embodiment, firmware 108 may include programs that may be used to partition the hardware resources of the platform hardware 100 such as hyper-threads, memory, and PCI resources (devices, buses, ports, and extensions) to enable a completely unmodified host OS 201 (sometimes referred to as legacy OS) and a service OS 203 to run independently of each other without employing virtualization as will be described.

In one embodiment, the host OS 201 may control legacy devices (e.g. industry standard architecture (ISA), serial ports, parallel ports, etc.) and legacy memory (e.g. memory below a certain value, e.g. one megabyte (MB)), whereas the service OS 203 may own PCI resources that can be hidden from the host OS 201 by disabling initial access to them. This initial access may be disabled by disabling function registers in the ICH 104 and by reserving memory in a memory map passed to the host OS 201, as will be described.

Thus, a host OS partition 230 may exist with certain OS and firmware drivers 234 and PCI resources 239, and a service OS partition 240 may also exist utilizing certain OS and firmware drivers 244 and PCI resources 249 in the same platform.

In order to accomplish this, embodiments of the invention relate to a method to transparently avoid interrupt request (IRQ) conflicts between the host OS 201 and the service OS 203 in partitioning PCI resources. In one embodiment, the burden to correctly select which PCI resources should be controlled by which OS (e.g. the host OS 201 or the service OS 203) are removed from the end user to firmware (e.g. firmware 108 of the platform hardware) in a two-phase approach.

In the first phase, firmware ensures that PCI resources 249 that are allocated to the service OS partition 240 do not conflict with PCI resources 239 that are allocated to the host OS partition 230. As will be described, this may be done by grouping together PCI resources that are hardwired to the same IRQ lines. This information about wiring may come from the ACPI table for the platform. The ACPI table may be maintained by the system BIOS 105.

For example, when the end user selects a particular PCI resource to be included in the service OS partition 240, all other PCI resources sharing the same IRQ line are also designated to be included in that service OS partition. User selections may be stored in non-volatile memory 107 between boots. It should be appreciated that an example of a host OS 201, may be, for example, WINDOWS, whereas an example of a service OS 203, may be LINUX, for example.

The second phase of the process begins when the firmware runs the service OS loader 242 and passes information about which PCI resources belong to the service OS 203. The service OS 203 allows its drivers 244 to use only those PCI resources 249. After the service OS 203 is fully loaded and all of its PCI resources 249 initialized, those PCI resources 249 are hidden by writing to the corresponding bits in the ICH's function disable register for those PCI resources. Afterwards, the host OS loader 232 may load the host OS 201 utilizing the traditional host OS legacy boot sequence.

More particularly, a method and system to partition hardware resources between OSs without utilizing virtualization and virtual memory is disclosed. In one embodiment, processor 101 may be used to implement one of a host operating system (OS) 201 or a service OS 203.

Firmware implemented by the processor may cause the processor to perform functions to accomplish this, such as: determining whether a first PCI resource attached to a line of the bus is to be sequestered to the service OS 203, and if so, sequestering the first PCI resource to the service OS 203; determining if at least one other PCI resource shares the same line of the bus as the sequestered first PCI resource, and if so, selecting the at least one other PCI resource; sequestering the other selected PCI resource to the service OS 203; and hiding the first PCI resource and the other sequestered PCI resource from host OS 201.

Similarly, it may be determined whether the first PCI resource attached to the line of the bus is to be sequestered to the host OS 201, and if so, the first PCI resource may be sequestered to the host OS 201, and if at least one other PCI resource is determined to share the same line of the bus as the first PCI resource sequestered to the host OS, the other PCI resource is selected and sequestered to the host OS, as well.

As previously discussed, in one embodiment, the first and other resources may be peripheral component interface (PCI) resources and the bus may be a PCI bus including interrupt request (IRQ) lines.

Advantageously, this process does not require any type of memory virtualization to partition the PCI resources.

Figure 3:
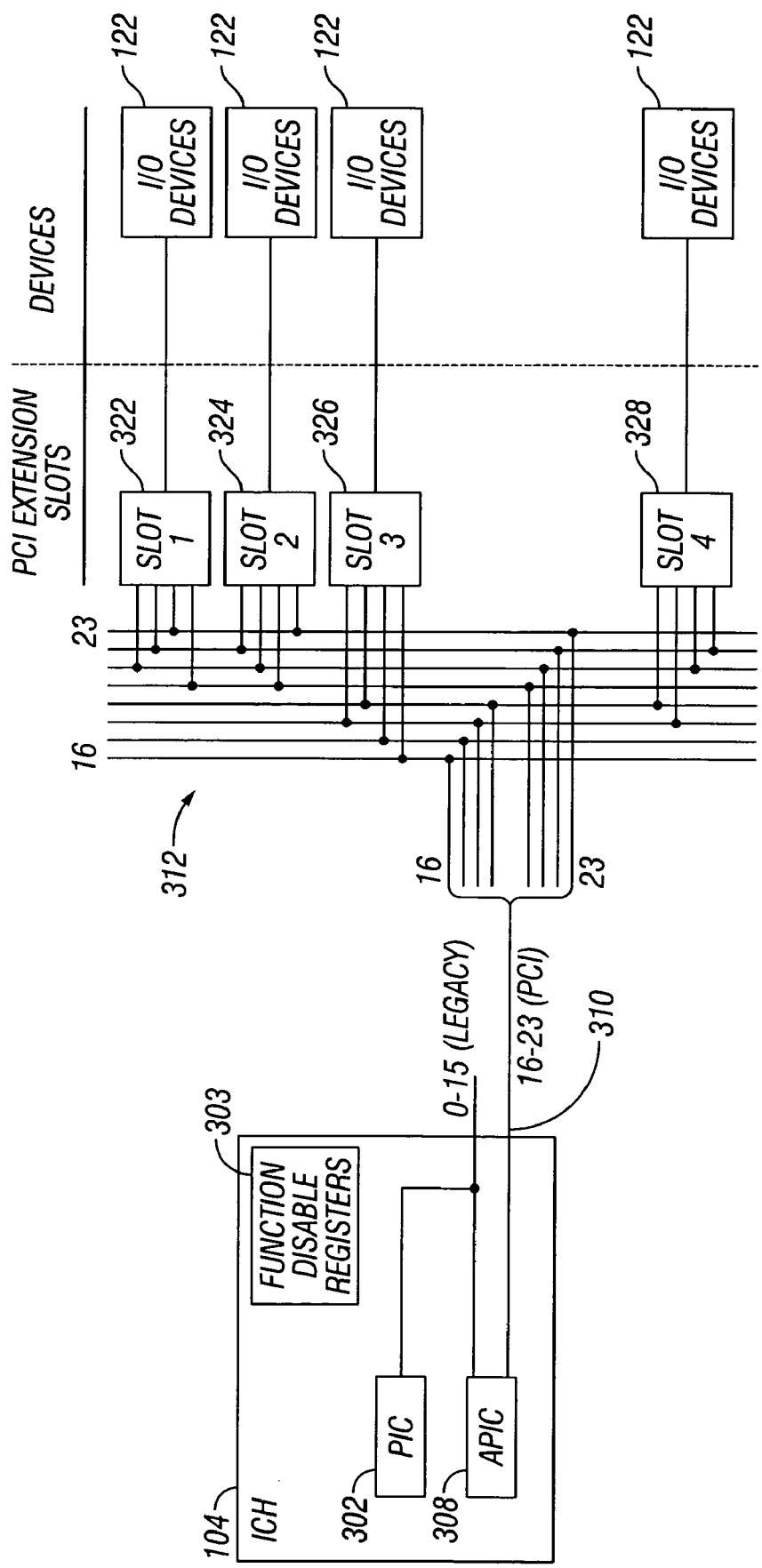
FIG. 3 is a diagram illustrating an example of an input/output control hub (ICH) coupled to a peripheral component interface (PCI) extension bus.

Turning now to FIG. 3, FIG. 3 is a diagram illustrating an example of an ICH 104 coupled to a PCI extension bus 312. Particularly, PCI bus 312 includes lines 16-23 to couple to PCI slot 1 322, PCI slot 2, 324, PCI slot 3 326, and PCI slot 4, 328, all of which respectively couple to I/O devices 122.

As can be seen in FIG. 3, ICH 104 may include a legacy programmable interrupt controller (PIC) 302 coupled to legacy lines 0-15 (not shown) as well as an advanced programmable interrupt controller (APIC) 308 which couples to the various lines 16-23 of PCI extension bus 312 to interconnect to the PCI extension slots and I/O devices, respectively.

More particularly, as shown in FIG. 3, the PCI extension bus 312 includes PCI interrupt request (IRQ) lines 16-23 which are hardwired to the various PCI extension slots 322, 324, 326, and 328, respectively. Information from the IRQ lines (16-23) as to which IRQ line connects to which slots, and which slots contain which devices, is received by APIC 308 and is encoded in the ACPI table of the system BIOS. This information from APIC 308 in conjunction with the results of an initial full PCI initialization scan, upon boot up, is utilized to build and populate data structures used by embodiments of the invention related to partitioning PCI hardware resources (e.g. PCI I/O devices 122) between the host and service OSs.

An example of a variety of different types of PCI resources (e.g. ports, controllers, adaptors, devices, etc.) of PCI extension slots (322, 324, 326, 328) coupled to respective IRQ lines 16, 17, 18, 19, and 23 is given below:

16: PCI Express Root Port
16: USB Universal Port Controller
16: Display Adapter
16: Bus Driver for High Definition Audio
17: PCI Express Root Port
17: PCI Express Gbit Ethernet Controller
18: PCI Express Root Port
18: USB Universal Port Controller
19: Ultra ATA Storage Controller
19: PCI Express Root Port
19: USB Universal Port Controller
23: USB Universal Port Controller
23: USB2 Universal Port Controller Turning now to FIG. 4, FIG. 4 is a block diagram illustrating a hide PCI resource data structure 400 that may be utilized to collect information about which PCI resources should belong to the service OS and hidden from the host OS, and which function disable registers 303 in the ICH 104 should be used to sequester these resources.

Also, a partition table based upon the hide PCI resource data structure may be utilized to record which resources should be sequestered and may be saved in non-volatile memory 107, to be preserved between boots. As will be described, the values in the partition table may be changed by the end user. However, as will be appreciated by the description below, the options available to the end user are somewhat limited by the platform's routing of IRQ lines. In other words, the selection method employs an algorithm that controls how the resources are to be partitioned to avoid IRQ conflicts.

Particularly, looking back at the hide PCI resource data structure 400 of FIG. 4, the hide PCI resource data structure includes a list of devices 402, a hide designator 404 which indicates whether or not the respective device should be hid or not from the host OS, and a disable register value 406 which indicates the ICH value for the function disable register 303 of the ICH to disable and therefore hide the device from the host OS.

Figure 5A:
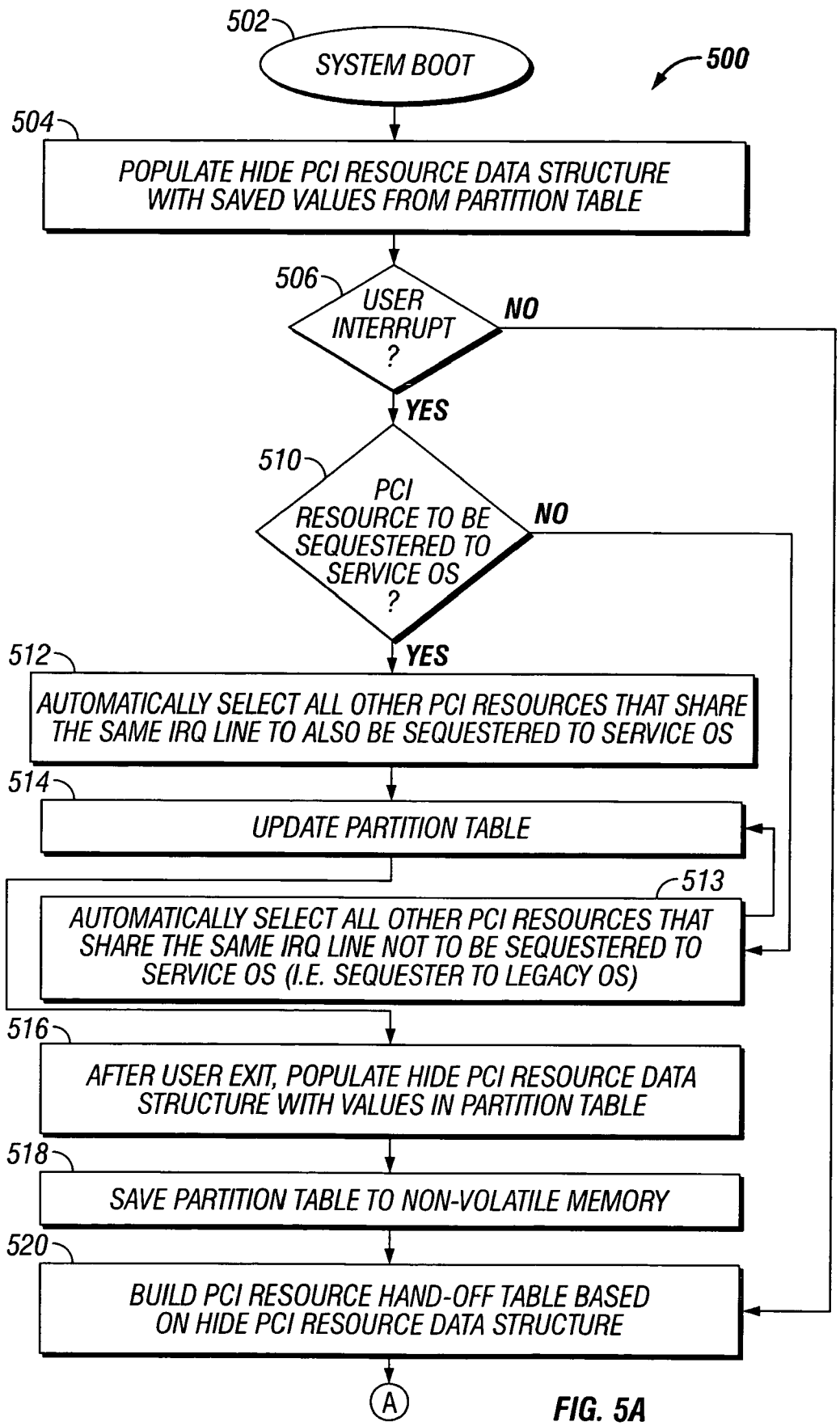
FIG. 5 is a flow diagram illustrating a process to partition PCI hardware resources between operating systems, according to one embodiment of the present invention.
Figure 5B:
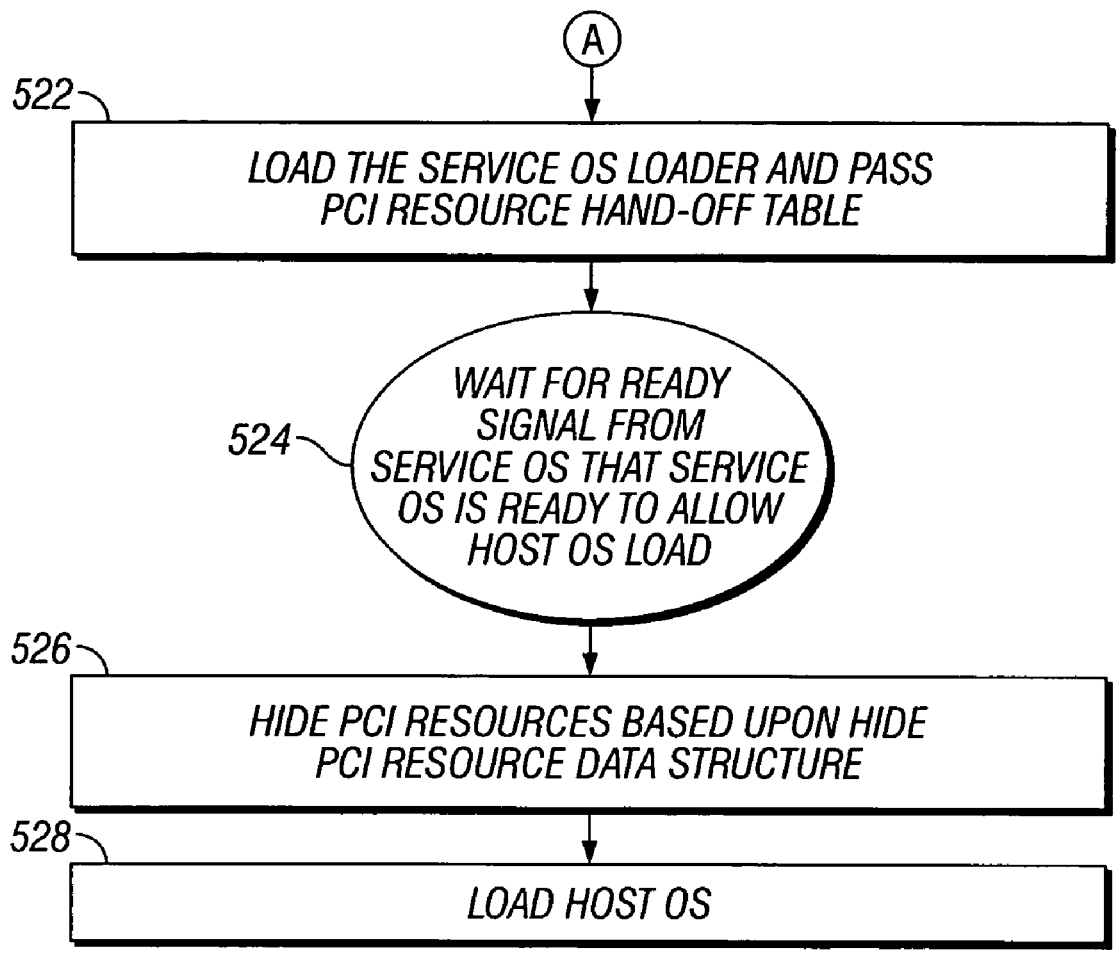

Turning to FIG. 5, FIG. 5 is a flow diagram illustrating a process 500 to partition PCI hardware resources between operating systems, according to one embodiment of the present invention. It should be noted that FIG. 5 is divided into FIG. 5A and 5B. At circle 502, the computer system is booted. Then, at block 504, the hide PCI resource data structure is populated with saved values preserved in the partition table from non-volatile memory. It should be appreciated that, in one embodiment, firmware may control the population of the hide PCI resources data structure, as well as other functionality related to partitioning PCI hardware resources between the host and service OS to be hereinafter described.

At decision block 506, it is determined whether an end user is interrupting the boot up process. If not, process 500 moves on to block 520, as will be described in more detail below.

However, if an end user is interrupting the boot up process, then the process 500 next moves to decision block 510 in which it is determined whether a PCI resource is attempting to be sequestered to the service OS by a user. If so, at block 512 all other PCI resources that share the same IRQ line are to be sequestered as well to the service OS. Then at block 514 the partition table is updated accordingly.

However, if at block 510, the PCI resource to be sequestered is not to be sequestered to the service OS, then all other PCI resources that share the same IRQ line are automatically selected to not be sequestered to the service OS (i.e. they are to be sequestered to the host or legacy OS) (block 512). Again, the partition table is updated (block 514).

In either event, after decision block 510, after user exit, the hide PCI resource data structure is populated with the values from the partition table and the partition table is saved in non-volatile memory. It should be appreciated that the hide PCI resources data structure 400, as previously described is properly updated with correct hide designators and values for the ICH disable register.

At block 520, a PCI resource handoff table based on the hide PCI data of the hide PCI resource data structure is built.

Next, at block 522, the service OS loader is loaded and the PCI resource handoff table is passed off.

At block 524, a ready signal from the service OS is waited for that designates that the service OS is ready to allow the host or legacy OS to load.

At block 526, the PCI resources based upon the hide PCI resource data structure are hidden. This may be accomplished by setting the disabled register ICH values 406 of the hide PCI resource data structure in the function disable register 303 of the ICH 104 itself such that these PCI resources are indeed disabled.

The host or legacy OS may then be loaded at block 528 with no IRQ conflicts.

Utilizing the above-described process 500, it is possible to partition PCI hardware resources in such a way as to enable at least a service OS and a host OS to run on the same platform without the need to utilize virtual memory. Further, embodiments of the invention also remove the need for specialized platform hardware additions needed to run a service OS.

It should be noted that in handling PCI slots, by default, all PCI resources on all four IRQ lines connected to a PCI slot that the end user wants to sequester, would also have to be sequestered. However, it is possible that the end user can be asked how many functions the device and the sequestered slot will use, and depending upon the answer from the end user, and the type of device, only resources on the IRQ lines that the device and the sequestered slot need can be sequestered. For example, if a PCI resource that uses four functions where all four functions are required for correct operation would typically cause the previously-described process to sequester all resources on the IRQ lines connected to (e.g. functions A, B, C, and D of the sequestered slot). However, in the case of a PCI card with four USB ports, the end user can decide that only two USB ports are needed and the end user may then instruct the computer system not to sequester resources connected to functions A and B, but only those connected to function C and D. This allows the end user to sequester as few or as many resources to be used by the service OS and leaves as many or as few resources as necessary to the host OS.

In another embodiment of the invention, referring back to FIGS. 1 and 2, when the firmware boots the service OS 203, the service OS 203 passes information about which PCI resources 249 the service OS 203 owns. The service OS programs I/O APIC table entries in the APIC corresponding to IRQ lines used by those PCI resources. For each entry programmed, the service OS 203 creates a watchdog to monitor that entry for any changes. Initially, all watchdogs wait for special watchdog signals. The watchdog signal is sent when the service OS 203 is fully initialized and just before the service OS 203 notifies the firmware it is ready to boot the host OS 201.

Each watchdog saves a copy of the corresponding entry and starts a timer. The timer event routine for each timer compares the contents of the corresponding entry to the saved copy and looks for any changes. When a change is detected, the contents of the entry are replaced with the saved copy and the timer is canceled and the watchdog is destroyed.

If the host OS 201 does not use the I/O APIC table to route interrupts but instead uses the legacy PIC, this method will still function because the service OS 203 does not control any legacy devices, and obtains a system check from the local APIC. Therefore, the entries of the I/O APIC table and the legacy PIC are never shared.

Figure 6:
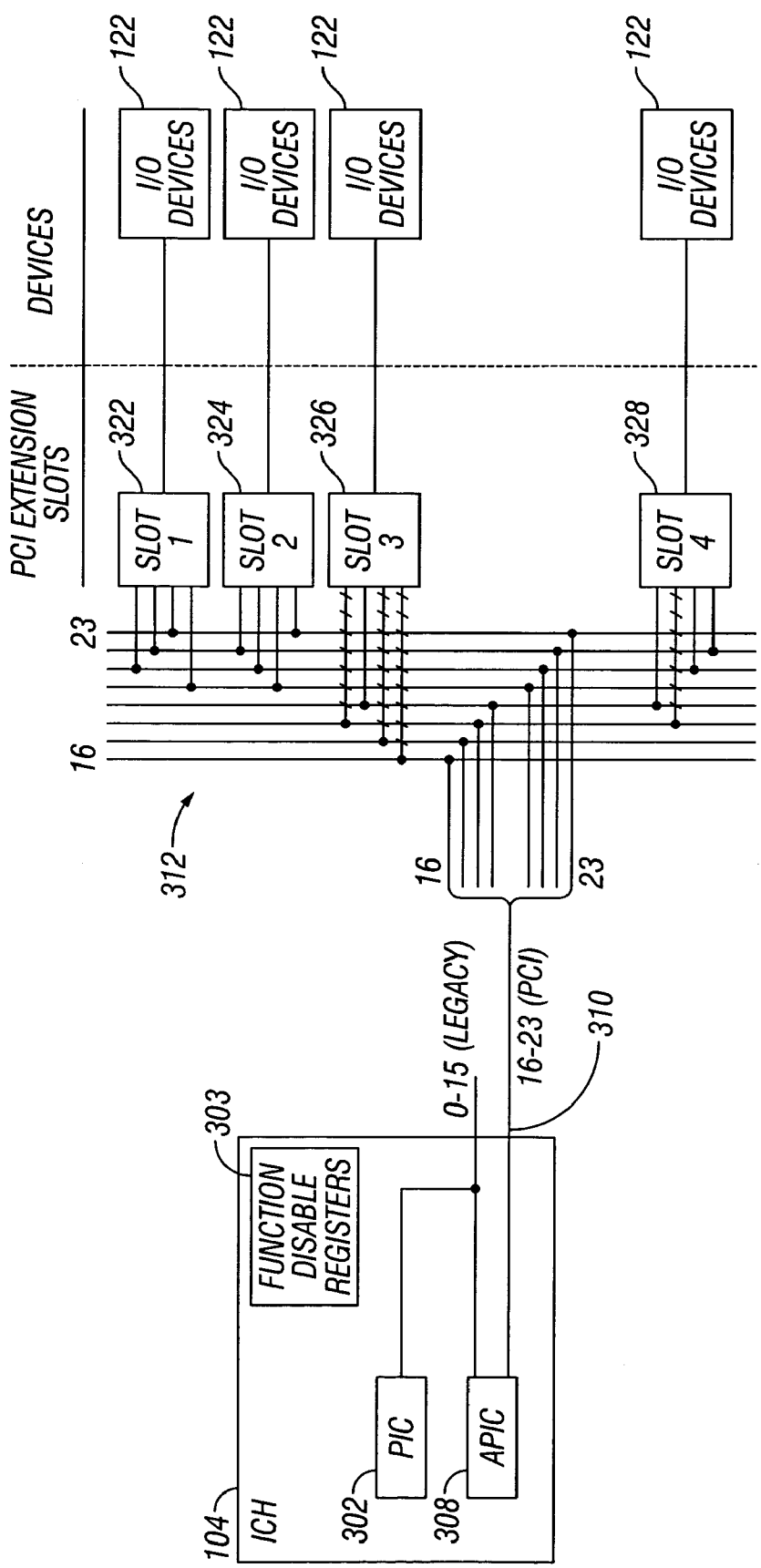
FIG. 6 is a diagram illustrating another example of an Input/Output Control Hub (ICH) coupled to a PCI extension bus.

Turning to FIG. 6, FIG. 6 is a diagram illustrating an example of an ICH coupled to a PCI extension bus 312. The solid lines represents connections between IRQ lines and PCI resources (e.g. I/O devices 122) under the control of the host OS 201 and the slashed lines represents connections between IRQ lines and PCI resources 122 under the control of the service OS 203. As will be described, by utilizing the following process is possible to sequester PCI resources in such a way that the I/O APIC table can be shared by creating two mutually exclusive sets of I/O APIC table entries.

Figure 7:
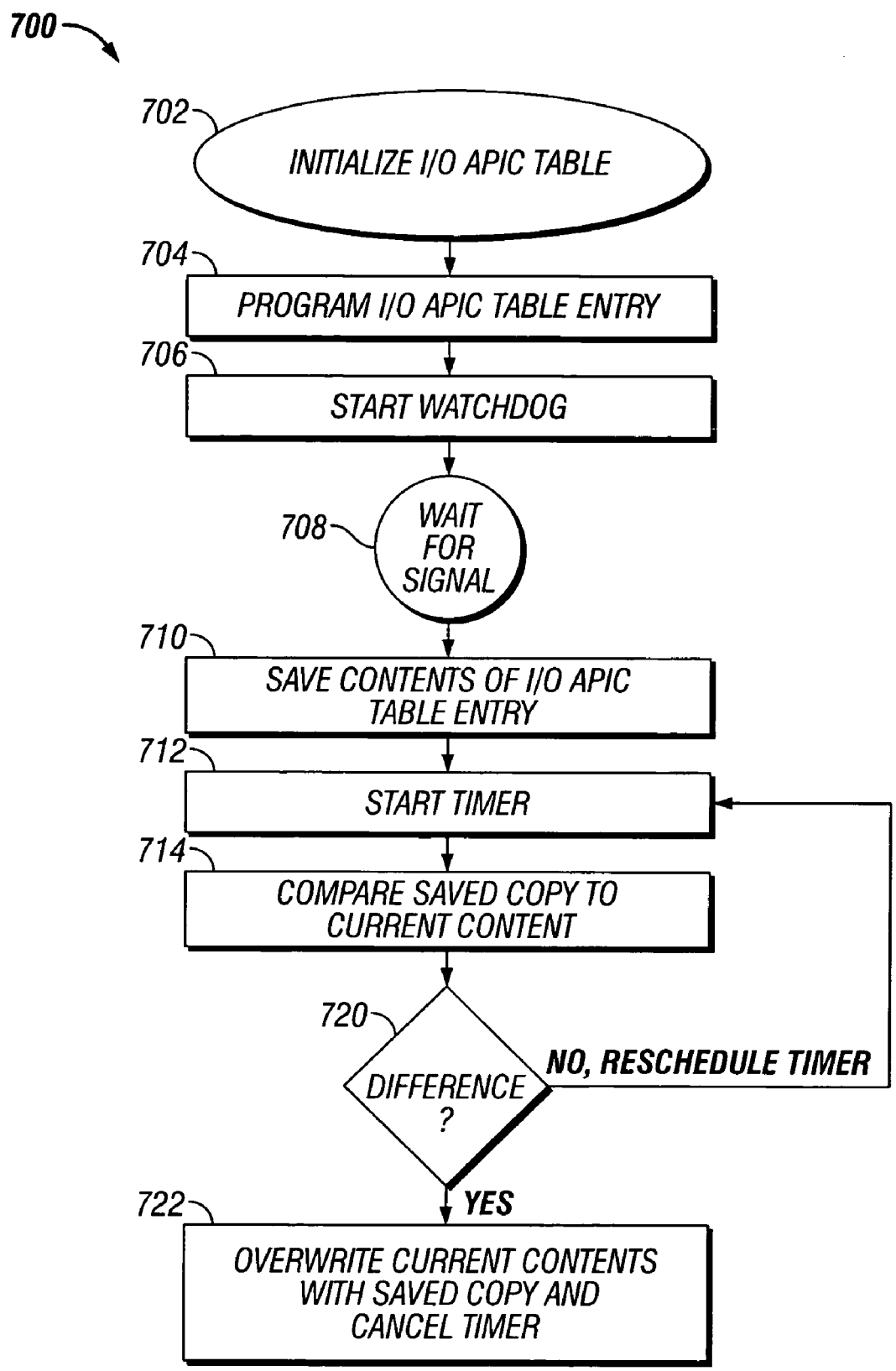
FIG. 7 is a flow diagram illustrating a process to monitor and fix I/O Advanced Programmable Interrupt Controller (APIC) table entries as implemented in the service OS, according to one embodiment of the present invention.

Turning now to FIG. 7, FIG. 7 is a flow diagram illustrating a process 700 to monitor and fix I/O APIC table entries as implemented in the service OS.

At block 702, an I/O APIC table is initialized. Next, the I/O APIC table entry entries are programmed (block 704). At block 706, a watchdog is started. The watchdog basically operates by waiting for a watchdog signal (block 708) saving the contents of the I/O APIC table entry (block 710), and starting a timer (block 712).

Next, the process 700 compares saved copies of entry contents to current contents of the I/O APIC table and, if no difference is detected (at decision block 720) then the timer is rescheduled. However, if a difference is detected, then the current contents of the I/O APIC table entries are overridden with the saved copy of the I/O APIC table entries and the timer is cancelled (block 722).

In this way, the host OS cannot overwrite contents of the I/O APIC table that has previously sequestered particular PCI resources to the service OS. In this way, it is possible to sequester PCI resources in such a way that the I/O APIC table can be shared by creating two mutually exclusive sets of I/O APIC table entries. Thus, I/O APIC(s) are shared in the same system so that both OSs can receive interrupts from the PCI resources assigned to them.

As previously discussed, embodiments of the invention partition hardware resources in general and PCI resources in particular in such a way as to enable two OSs on the same platform to run and route interrupts without the use of virtual memory. Further, specialized platform hardware is not needed to run the service OS.

While embodiments of the present invention and its various functional components have been described in particular embodiments, it should be appreciated that the embodiments of the present invention can be implemented in hardware, software, firmware, middleware or a combination thereof and utilized in systems, subsystems, components, or sub-components thereof.

When implemented in software or firmware, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, bar codes, etc. The code segments may be downloaded via networks such as the Internet, Intranet, etc.

Further, while embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. A method comprising:
    determining whether a first peripheral component interface (PCI) resource attached to a PCI bus including interrupt request (IRQ) lines is to be sequestered to a service operating system (OS), and if so, sequestering the first PCI resource to the service OS;
    determining if at least one other PCI resource that is also attached to the PCI bus including interrupt request (IRQ) lines shares the same line of the bus as the sequestered first PCI resource, and if so, selecting the at least one other PCI resource;
    sequestering the other selected PCI resource to the service OS; and
    hiding the first PCI resource and the other sequestered PCI resource from a subsequently loaded host OS without utilizing memory virtualization;
    wherein hiding the first PCI resource and the other sequestered PCI resource includes storing values associated with the first PCI resource and the other PCI resource to be sequestered to the service OS in a hide resource data structure, the hide resource data structure being used to determine which PCI resources are to be hidden from the subsequently loaded host OS.

2. The method of claim 1, further comprising, determining whether the first PCI resource attached to the line of the bus is to be sequestered to the host OS, and if so, sequestering the first PCI resource to the host OS.

3. The method of claim 2, further comprising, determining if at least one other PCI resource shares the same line of the bus as the first PCI resource sequestered to the host OS, and if so, selecting the other PCI resource and sequestering the other selected PCI resource to the host OS.

4. The method of claim 1, wherein the hide resource data structure includes disable register values corresponding to values to be set in an input/output controller to disable the first PCI resource and the other PCI resource to be sequestered to the service OS such that these PCI resources are disabled when the host OS is loaded.

5. A system comprising:
a processor to implement one of a host operating system (OS) or a service OS;
an input/output (I/O) controller coupled to the processor and to a PCI bus including interrupt request (IRQ) lines;
wherein firmware implemented by the processor causes the processor to perform the following operations including:
determining whether a first peripheral component interface (PCI) resource attached to an IRQ line of the PCI bus is to be sequestered to the service OS, and if so, sequestering the first PCI resource to the service OS;
determining if at least one other PCI resource shares the same IRQ line of the PCI bus as the sequestered first PCI resource, and if so, selecting the at least one other PCI resource;
sequestering the other selected PCI resource to the service OS; and
hiding the first PCI resource and the other sequestered PCI resource from
host OS without utilizing memory virtualization;
wherein hiding the first PCI resource and the other sequestered PCI resource includes storing values associated with the first PCI resource and the other PCI resource to be sequestered to the service OS in a hide resource data structure, the hide resource data structure being used to determine which PCI resources are to be hidden from the subsequently loaded host OS.

6. The system of claim 5, wherein the processor further determines whether the first PCI resource attached to the line of the bus is to be sequestered to the host OS, and if so, the first PCI resource is sequestered to the host OS.

7. The system of claim 6, wherein the processor further determines if at least one other PCI resource shares the same line of the bus as the first PCI resource sequestered to the host OS, and if so, selects the other PCI resource and sequesters the other selected PCI resource to the host OS.

8. The system of claim 5, wherein the I/O controller is an I/O control hub (ICH) included in a chipset, the chipset coupled to the processor.

9. The system of claim 8, wherein the ICH includes disable registers, and wherein the hide resource data structure includes disable register values corresponding to values to be set in the disable registers of the ICH to disable the first PCI resource and the other PCI resource to be sequestered to the service OS such that these PCI resources are disabled when the host OS is loaded.

10. A machine-readable medium having stored thereon instructions, which when executed by a machine, cause the machine to perform the following operations comprising:
determining whether a first peripheral component interface (PCI) resource attached to a PCI bus including interrupt request (IRQ) lines is to be sequestered to a service operating system (OS), and if so, sequestering the first PCI resource to the service OS;
determining if at least one other PCI resource that is also attached to the PCI bus including interrupt request (IRQ) lines shares the same line of the bus as the sequestered first PCI resource, and if so, selecting the at least one other PCI resource;
sequestering the other selected PCI resource to the service OS; and
hiding the first PCI resource and the other sequestered PCI resource from a subsequently loaded host OS without utilizing memory virtualization;
wherein hiding the first PCI resource and the other sequestered PCI resource includes storing values associated with the first PCI resource and the other PCI resource to be sequestered to the service OS in a hide resource data structure, the hide resource data structure being used to determine which PCI resources are to be hidden from the subsequently loaded host OS.

11. The machine-readable medium of claim 10, further comprising, determining whether the first PCI resource attached to the line of the bus is to be sequestered to the host OS, and if so, sequestering the first PCI resource to the host OS.

12. The machine-readable medium of claim 11, further comprising, determining if at least one other PCI resource shares the same line of the bus as the first PCI resource sequestered to the host OS, and if so, selecting the other PCI resource and sequestering the other selected PCI resource to the host OS.

13. The machine-readable medium of claim 10, wherein the hide resource data structure includes disable register values corresponding to values to be set in an input/output controller to disable the first PCI resource and the other PCI resource to be sequestered to the service OS such that these PCI resources are disabled when the host OS is loaded.

* * * * *